United States Patent [19]
Cerniglia

[11] 3,916,781
[45] Nov. 4, 1975

[54] BALE EJECTION SYSTEM

[75] Inventor: Vincent J. Cerniglia, Rosemont, Pa.

[73] Assignee: American Environmental Products Corporation, Glassboro, N.J.

[22] Filed: Feb. 16, 1973

[21] Appl. No.: 333,271

[52] U.S. Cl. .................. 100/53; 100/218; 100/220; 100/245; 100/255; 100/295
[51] Int. Cl.² ..................................... B30B 15/32
[58] Field of Search ............ 100/53, 218, 220, 255, 100/295, 245

[56] References Cited
UNITED STATES PATENTS

| | | | |
|---|---|---|---|
| 10,920 | 5/1854 | Dederick | 100/255 |
| 181,632 | 8/1876 | Brock | 100/218 X |
| 235,295 | 12/1880 | Riesel | 100/218 |
| 273,407 | 3/1883 | Tyack | 100/218 UX |
| 1,040,396 | 10/1912 | Paal | 100/218 |
| 2,965,017 | 12/1960 | Haines | 100/218 |
| 3,024,720 | 3/1962 | Welsh | 100/245 X |
| 3,728,959 | 4/1973 | Fredrickson | 100/218 |

*Primary Examiner*—Billy J. Wilhite
*Attorney, Agent, or Firm*—Haight, Hofeldt, Davis & Jambor

[57] ABSTRACT

A bale ejection system for a baling apparatus having a frame defining a compacting chamber and a ram mounted for vertical reciprocal movement within the frame, to compress waste material in the compacting chamber into a bale, including bale support means pivotally mounted on the frame and disposed adjacent the bottom and a side of the compacted bale, bale lift means pivotally mounted on the bale support means and having catch means formed near their upper ends. The bale lift means are manually movable into the path of the upwardly moving ram so that the ram will engage the catch means and raise the lift means relative to the frame causing the bale support means to pivot upwardly and forwardly relative to the bottom of the compacting chamber to eject the bale. A method of making a bale ejection system for a conventional vertical ram baling apparatus including pivotally mounting the bale support means near a lower edge portion of the frame means, pivotally mounting the bale lift means on the bale support means and providing actuating means to allow controlled timed movement of the lift means into the upward path of travel of the ram to operate the bale ejection system.

13 Claims, 8 Drawing Figures

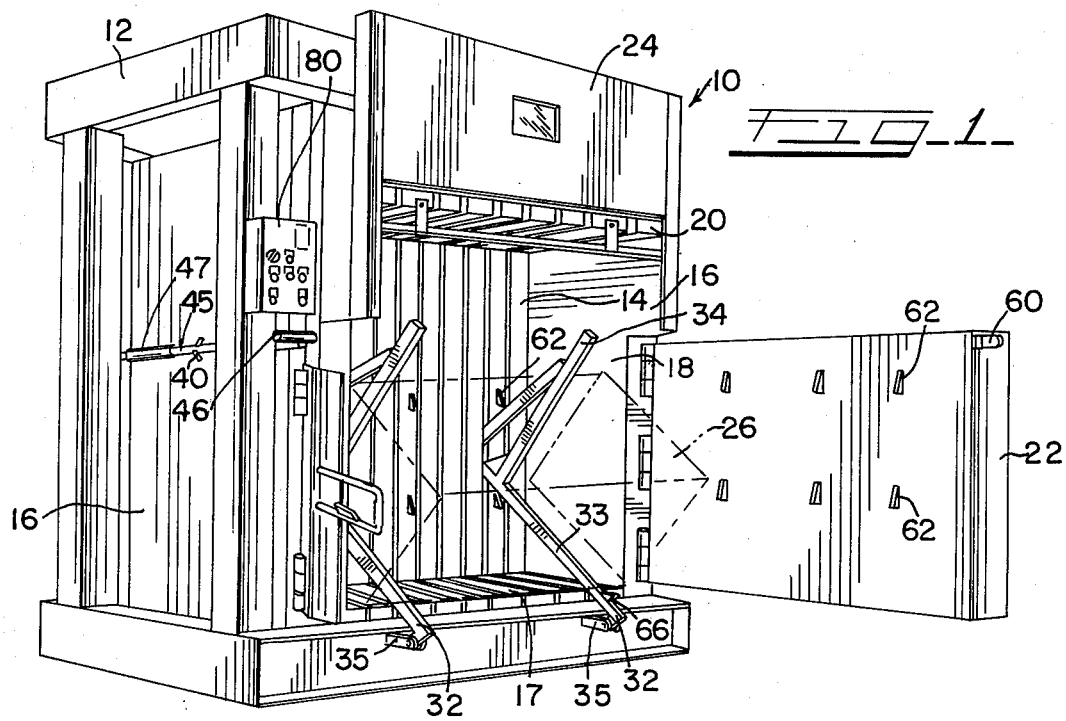
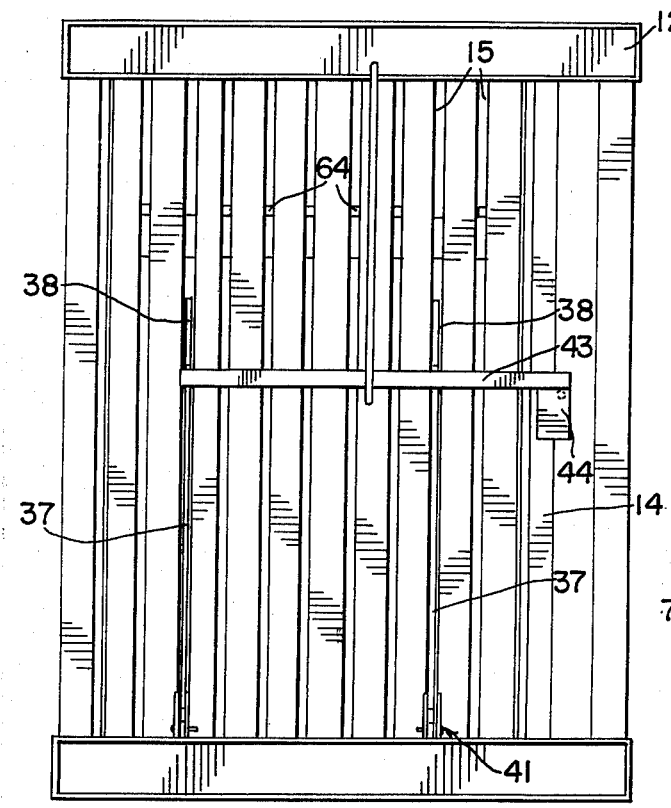
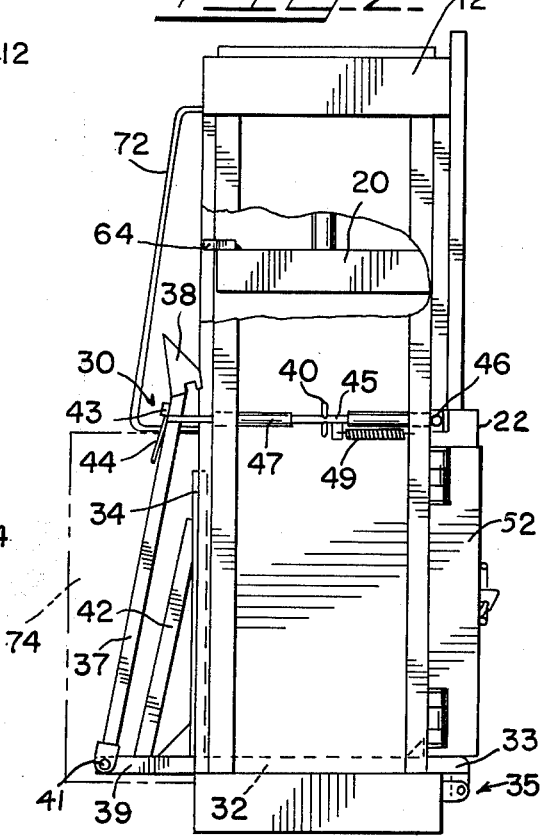

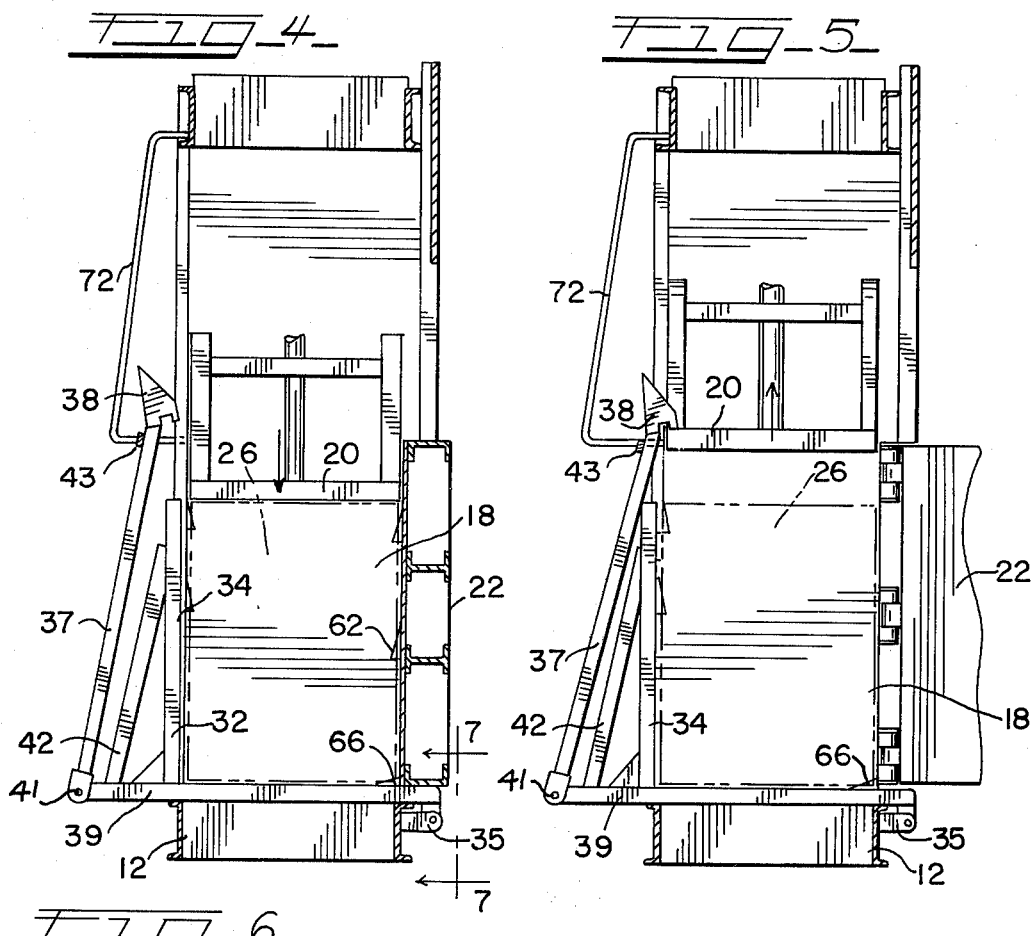

BALE EJECTION SYSTEM

BACKGROUND OF THE INVENTION

This invention relates to baling or compacting apparatus in general, and, in particular, to an inexpensive system for ejecting a compacted bale from such an apparatus in a reliable and safe manner.

Baling presses or compacters which use a platen or ram to exert pressure on a volume of waste material such as cardboard and the like, contained within a compacting chamber of definite volume to produce a pressed pack or bale of material substantially reduced in volume, are well known. One popular type of baler is a vertical ram baler, and includes a generally rectangular frame which has an enclosable compacting chamber defined by a portion of the frame and supports a ram for vertical reciprocal movement along the frame. In operation, the ram is moved toward the waste material which has been deposited in the compacting chamber through a receiving door, and acts to exert a significant force (up to 40,000 pounds or more depending on the size of the baler) on the material. The waste material is thereby formed into a bale taking the shape of the chamber and is normally removed through a door which forms one side of the compacting chamber.

One of the most significant problems encountered in the operation of this type of baling system has been in easily removing the bales from the compacting chamber after compaction. Such bales may be as large as 60 inches wide by 30 inches deep by 48 inches high and weigh approximately 800 pounds. It can be appreciated that such a bale cannot be manually removed from the chamber safely or easily. More importantly present systems for mechanically ejecting such bales have been neither reliable nor safe, since they tend to break easily and have not permitted the operator to control ejection of the bale or provided means to prevent accidental operation of the ejectors and damage to the baler or possible injury to the operator.

An example of a mechanical ejecting apparatus is shown in the Russian patent to Nizkokhat, No. 144,725. Nizkokhat teaches a baling press having an upper platen 2 which is moved vertically with respect to a pair of guide rods shown at 9. These guide rods are pivotally connected to a lower plate 3 so that as the platen moves upwardly after compressing the material, the heads of spring loaded pistons may be activated by a cable system to engage the rods to lift the rods and pivot plate 3 about a forward pivot point. The major disadvantage of the Russian system lies in the mechanically complex lever-cable-spring loaded piston arrangement required for actuation of the ejection system. This piston system must be mounted internally of the baling apparatus and therefore is difficult to operate with any degree of safety. Such a system is also mechanically unreliable and too complex and expensive to be used to easily and readily modify existing balers. Present widely used chain ejector systems tend to break so easily under stress, presenting severe hazards, that guides and safety shields must be used to protect personnel and constant replacement is necessary.

Other disadvantages of existing balers have been that the waste placed in the compacting chamber tends to work its way upwardly between the frame and the ram preventing tying of the bale and often fouling the controls on top of the ram. In addition, present ejection systems offer no reliable means to prevent accidental engagement of the baling system when the door is closed or to assure that the door to the compacting chamber will remain safely locked during operation of the press.

DESCRIPTION OF THE INVENTION

The present invention provides a bale ejection system having control and safety features which not only prevent damage to the baling apparatus but also reduced the danger of operator injury, and which is extremely simple in mechanical construction and operation, is inexpensive to manufacture and may be installed on existing and conventional vertical ram-type balers.

This bale ejection system and the method of adapting it to existing baling apparatus overcomes the problems and disadvantages of the prior art by a pair of spaced, generally L-shaped bale support means which are pivotally mounted near a bottom edge of a compacting chamber of a conventional vertical ram-type baler adjacent the chamber door. In non-operating position a first leg of the "L" is disposed in the plane of the floor of the baler and the second, generally upwardly leg of the L is disposed in the plane of the rear wall of the baler. The bale support arms each have a lever arm extending outwardly from the junction of the first and second legs through spaced slats or vertical slots conventionally formed in the rear wall of the baler frame.

A pair of spaced, generally upright lifting arms are pivotally mounted on the outward end of this lever arm. These lift arms have, formed or mounted at their upper ends a catch means which is formed in an inverted hook shape. The lifting arms are movable inwardly toward the baler by an actuating handle and arm which may be only moved when the door forming one side of the compacting chamber and closing the compacting chamber is open for ejection of the bale.

When the actuating handle and arm is moved forward, the lifting arms are pivoted inwardly with respect to the baler frame and the bale support arms such that the hook-shaped catch means are received between the spaces or slots between the steel channels forming the rear of the baler to be disposed in the path of travel of the baling ram. When the baling ram is moved in an upwardly direction after compaction of the material, it will engage these hooks thereby raising the lifting arms, which, in turn, pivot the bale support arms about their forward pivot points to bring them adjacent the bottom and a side of the bale. As the support arms continue to pivot, the bale is moved with them relative to the front edge of the baler frame and toward the opening formerly closed by the compacting chamber door. By controlling the speed of the upward movement of the baling ram, the pivoting movement of lifting arms and the bale support arms may likewise be controlled so that the heavy bale is gradually moved to a point where its center of gravity lies beyond its lower edge, thereby causing the bale to gently free-fall to the floor or onto a pallet for easy removal.

The unique structure of the present invention eliminates the problems presented by the prior art ejectors. The upper, hooked-shaped catch portion of the lifting arms can only be moved into operating position by a manually controlled safety handle and arm. Operation of the system is not dependent upon a series of springs, pulleys or pistons and is controlled in a convenient and safe manner from outside the baler.

The present bale ejection system may be installed on most conventional vertical ram balers having a spaced channel construction in their bottom and rear walls to accommodate the support and lifting arms. The location of the pivot points in this system provides a significant mechanical advantage which reduces the required structural strength of the arms and the stresses exerted on the arms and on the baling ram itself in the ejection operation.

In connection with a conventional vertical ram baler, the present invention also contemplates use of wedge-shaped guide fingers which may be mounted on the periphery of the baling ram between the channels forming the walls of the baler to not only guide the movement of the ram, but also to prevent cardboard or the like materials from moving past the ram up into the top of the baler. This is important since such waste materials may foul the controls positioned on top of the ram and also because, when cardboard is forced between the ram and the baler walls, the wire ties necessary to tie the bale cannot be fed through these walls.

A novel door lock is also contemplated for use in connection with the present bale ejection system which provides positive locking for the heavy baler door along its height through a locking angle pivotally mounted on the frame to engage the front face of the door. With the door in locked position, the safety handle and arm, which must be moved forwardly to activate the ejection system, are rendered immovable, preventing an accidental attempt to eject the bale when the door is closed.

The formation of the upper portions of the lifting arms in an inverted hook configuration is an added fail-safe feature which causes the lifting arm to be automatically pushed out of the path of the ram rather than bent, if, for some reason, the ram is moved downwardly after ejection of the bale.

Accordingly, it is an object of this invention to provide a bale ejection system which is mechanically simple and inexpensive to manufacture and provides reliable, safe and controlled ejection of a compacted bale from a vertical ram-type baler.

It is a further object of this invention to provide a bale ejection system having a positively actuated ejection means which is, upon actuation, automatically operated by upward movement of a baling ram.

It is another object of this invention to provide a bale ejection system having a number of guide means mounted on the baling ram which guide the reciprocal movement of the ram and keep waste material contained beneath the lower face of the ram.

It is a still further object of this invention to provide a bale ejection system having a positively locking door which securely closes one side of the compacting chamber of the baler and prevents, in closed position, accidental operation of the ejection system.

It is one more object of this invention to provide a bale ejection system having a safety actuation means which must be positively moved, after opening of the compaction chamber door, to disengage the ejection system and which prevents the door from closing while the ejection system is in operating position.

It is one more object of this invention to provide a method of making a bale ejection system by providing a bale ejection apparatus which may be quickly and easily mounted on a conventional vertical ram-type baler.

These and other objects of the present invention will become evident from the following detailed description of the invention taken in conjunction with the drawings wherein:

FIG. 1 is a perspective view of a vertical ram-type baler incorporating the bale ejection system of the present invention;

FIG. 2 is a side view of the baler and bale ejection system of FIG. 1, showing in cutaway, the guide fingers mounted on the baling ram;

FIG. 3 is a rear view of the baler and bale ejection system shown in FIG. 1 showing the guide fingers mounted on the baling ram;

FIGS. 4–6 are elevational cross-sectional views illustrating the sequential operation of the bale ejection system of the present invention, in which FIG. 4 shows the baler ram in a down, compacting position, FIG. 5 shows the ram moving upwardly to engage the ejector mechanism, and FIG. 6 shows the ejector mechanism moving the bale into position to be ejected through the compacting chamber door;

FIG. 7 is a fragmentary view of the bottom front edge of the baler shown in FIG. 1 showing the bale support arms in non-operating condition; and, FIG. 8 is a fragmentary view of the compacting chamber door shown in FIG. 1 showing in detail the door locking mechanism.

Referring now to the drawings, and in particular, to FIG. 1, a baling apparatus of the vertical ram type is shown generally at 10. Such an apparatus normally consists of a heavy-duty reinforced steel frame 12 supporting a rear wall 14, side walls 16 and a bottom 17. As shown in the drawings, the rear wall 14 and bottom 17 are preferably formed by steel channel members spaced to provide continuous openings or slots 15 between them to permit wire ties to be looped around a compacted bale. The walls and bottom of the frame 12 define, at their lower portion, a compacting chamber shown generally at 18. One side of the compacting chamber is formed by a compacting chamber door 22 which may be hingedly mounted on the frame 12 for opening and closing movement relative to it.

Above the chamber door 22 is positioned a receiving door 24 which is movable on hinges or in channels to provide access to the interior of the baling apparatus 10 above the compacting chamber 18. This receiving door 24, when open, allows waste material to be placed in the compacting chamber 18 with the chamber door 22 closed. A small transparent window in the receiving door 24 permits the operator to observe the continuous operation of the baling press in safety.

The frame 12 also supports, for reciprocal vertical movement within it, a baling ram or platen 20. This ram 20 is movable by either mechanical or hydraulic means toward and away from the waste material contained in compacting chamber 18. The ram 20 is used to exert a substantial downward pressure on waste materials randomly placed in the compacting chamber 18 sufficient to form such materials into the generally rectangular shape of the chamber. In normal operation, with the chamber door 22 closed, the ram 20 is moved downwardly upon the waste materials, pressing them into bale form and then returned to an upward position while additional materials are fed into the chamber 18. The compressing operation may again be performed until a bale 26 of the desired size and weight is shaped. Wire ties are then fed through the slots 15 in the bottom 17 and rear wall 14 of the compacting chamber and the bale is bound together.

The present invention uniquely provides a bale ejection system, shown generally at 30 in FIG. 2, which may be incorporated directly into new baling apparatus similar to that described above, during manufacture, or which may be itself produced in a kit form and easily mounted on existing and in-place baling apparatus. The bale ejection system 30 of this invention includes a pair of spaced L-shaped arms 32, as shown in FIGS. 1 and 2, having a first or lower leg 33, and a second or upper leg 34 disposed perpendicularly to the first leg 33. The forward end of the first leg 33 of the L-shaped arms 32, i.e., that end adjacent the chamber door 22, is pivotally mounted on the baling frame 12 on forward pivot points 35. It is clear that the method of pivotal connection or mounting may take any suitable form, such as the pin and clevis arrangement shown in the drawings, as long as it allows the L-shaped arms 32 to be moved in unison about the forward edge of the compacting chamber 22 during bale ejection, and allows the first leg 33 and the second leg 34 to be disposed in the bottom 17 and rear wall 14, respectively, of the baling apparatus 10, during compacting of the bale.

A rear lever arm 39 extends outwardly from the junction of the legs 33 and 34, parallel to leg 33. A reinforcing bar 42 is mounted between lever arm 39 and upper leg 34 to strengthen L-shaped arms 32. A lifting arm 37 is pivotally mounted for movement relative to the frame 12 and the L-shaped arm 32 near the rearward end of each lever arm 39. Each lifting arm 37 has, at its upper portion, a hook-shaped catch 38 formed or mounted on it. The operation of this catch 38 will be explained in detail below.

The pair of lifting arms 37 are preferably linked together for unitary movement by a transverse lifting arm bar 43 which is welded to or otherwise mounted on these arms 37 below the catches 38. At one end of this bar 43 is mounted a downwardly extending safety arm plate 44. When the bale ejection system is not in operation, that is, when the compacting chamber door 22 is closed, a forward face of this plate 44 is in intimate contact with a system actuating shaft 45 and handle 46 as shown in FIG. 2. This actuating shaft 45 extends generally horizontally along a side of the baling apparatus frame 12 toward the front and terminates in a hook-shaped handle 46 near an upper corner of the compacting chamber door 22. Actuating shaft 45 rides in one or more hollow guide sleeves 47 mounted on the baler frame 12. The actuating shaft 45 and handle 46 are urged toward the front of the baling apparatus by a spring 49 having one end mounted on the frame 12 and its opposite end mounted on shaft 45. Thus, when the compacting chamber door 22 is open, the actuating shaft 45 moves forward away from safety plate 44 to allow the lifting arms 37 to be moved forward in unison into position to engage the baling ram 20. Inwardly-extending stop tabs 40 are mounted on shaft 45 to prevent any rotation of the shaft 45 and handle 46 which might accidentally cause lateral movement of the actuating shaft 45. A guide bar 72 mounted on the rear wall of the baler frame prevents any excessive rearward movement of lift arms 37. The lower portions of lift arms 37 may be enclosed by covers 74, shown in broken lines in FIG. 2, as a safety measure.

The compacting chamber door 22, which is shown in open position in FIG. 1, has a unique locking apparatus 50, shown in more detail in FIG. 8, which allows the door to be maintained securely and safely in a locked position despite the pressure exerted on the waste material inside the chamber. This door locking apparatus 50 includes a generally vertical locking angle 52 mounted for pivotal movement relative to frame 12 on heavy-duty hinges 56 mounted on the frame. Locking angle 52 is connected to a door handle 54 so that movement of the handle 54 causes movement of the locking angle 52 on hinges 56. Locking angle 52 is a right angle of slightly shorter length than the height of door 22. It is disposed on the frame 12 so that as the handle 54 is brought adjacent the front face of the closed door 22, one leg of the locking angle 52 will be rotated parallel and adjacent the front face of door 22, as shown in FIG. 2. Thus, when force is exerted on the inside face of door 22, during compaction, this force will be uniformly distributed throughout the substantial length of the locking angle 52 to prevent movement of the door 22 with respect to the frame 12. A safety latch 68 mounted on the door 22 engages a tab 70 mounted on the handle 54 to latch the door in a closed position. Door 22 also has, in its upper corner, a safety blocking tab 60 which is disposed in the path of forward movement of the actuating shaft 45 and handle 46 to prevent any forward movement of shaft 45, when door 22 is in a closed position. Since the shaft 45 and the handle 46 may not, therefore, be moved forward with the door in a closed position, the lifting arms 37 must likewise remain in a back, or non-operative, position preventing any engagement with the ram 20 and operation of the bale ejection system when the door 22 is in a closed position. A door blocking tab 66, mounted on lower leg 33 of L-shaped arm 32, as shown in FIG. 1, also prevents movement of the L-shaped arms 32 with the door in a closed position, and, conversely, prevents closing of the door 22 when the arms 32 are not aligned with the rear wall and bottom of the baler. This prevents damage to the bale ejection system by accidental closure of the door.

This invention also provides a number of novel guide fingers 64 which may be pieces of square stock welded or otherwise mounted on the top edge of the baling ram 20 and extending between the slots 15 in the rear wall 14 of the chamber 18 to ride along this wall and thereby guide the downward movement of the ram 20 while also preventing upward movement of waste material which normally tends to collect between the ram 20 and the inside walls of the baler or gathers on top of the ram 20 and fouls the wiring and controls mounted there. A number of waste blocking wedges or gussets 62 are also mounted on the interior side walls 16 or door 22 of the compacting chamber 18 to prevent upward creep of waste material along these walls.

In a typical baling operation using the present bale ejection system, the door 22 is initially in a closed position, as shown in FIG. 2. In this position, the safety blocking tab 60 on the door 22 pushes against the handle 46 and forward end of the actuating shaft 45 to urge the shaft to a backward position whereby its opposite end pushes against plate 44 and thereby maintains the lifting arms 37 out of engagement with the baling ram 20. In this non-operative position of the ejection system, the first leg 33 and the second leg 34 of L-shaped arm 32 are disposed in the planes of the bottom 17 and rear wall 14, respectively, of the baler frame 12, as shown in FIGS. 2 and 7.

FIG. 4 illustrates the typical movement of the baling ram 20 downwardly into the compacting chamber 18, upon activation by control means 80, to compress any material in that chamber into a form of a bale. When sufficient compression of material to a desired bale size has been achieved, the door 22 to the chamber is normally opened and baling wire is inserted between the slots 15 in the rear and bottom walls of the chamber and the bale is bound together as tightly as possible to maintain it in its compressed form. At this point, it becomes necessary to remove the compacted bale 26 from the compacting chamber 18.

When the door 22 is intially opened, spring 49 urges the actuating shaft 45 and handle 46 to a forward position eliminating the rearward force exerted against the lift arms 37 through safety plate 44 when the door 22 is closed. This allows lifting arms 37 to move forward in unison, under the influence of their own weight. In this manner, the upper portion of each lift arm 37, on which the hook-shaped catch 38 is mounted, is moved into the position shown in FIG. 5. As the ram 20 is raised, as shown in FIG. 6, it will engage both hook-shaped catches 38 over its top edge in a secure manner and thereby move the lift arms 37 upwardly with it. This vertical movement of the lift arms 37 is transmitted through the pivotal rear connection 41 and the rear lever arm 38 to the L-shaped arms 32, causing these L-shaped arms to be pivoted around the forward pivot point 35 as described above. This pivoting continues with the upward movement of the baling ram 20 until a point is reached at which the center of gravity of the compacted bale 26 is rotated beyond the forward edge of the bale, causing the bale to gently fall over onto the floor or a pallet positioned outside the baling apparatus 10 for easy removal. It is clear that the speed of the ejection of the bale may be controlled by the upward speed of the baling ram 20.

The hook-shaped catches 38 mounted on the upper end of the left arms 37 are formed to engage over the edges of the baling ram 20. They are also uniquely configured so that should the lift arms 37 be accidentally positioned in the path of the baling ram 20 when the baling ram is lowered, the ram will, on moving down the inclined upper edge of the catches 38, act to push the lift arms 37 rearwardly rather than bending them.

After ejection of the bale, the ram 20 is lowered to the position shown in FIG. 4 whereupon the actuating shaft 45 and handle 46 may be pushed rearwardly against the safety plate 44 thereby moving the lift arms 37 to the position shown in FIG. 4. The door 22 may then be closed so that the ejection blocking tab 60 prevents forward movement of the actuating shaft 45 and engagement of the ejecting system. The door 22 is locked by moving the handle 54 toward the face of the door which rotates the locking angle 52 mounted on frame 12 into engagement with the face of the door 22.

The materials suitable for forming the elements of this invention must, in general, be able to withstand the severe shear and bending stresses which might be exerted by 40,000 pounds of force, or required to lift an 800 pound compacted bale. Among such materials would be iron, steel or steel alloys many of which could be tempered or hardened to obtain added strength.

While the invention has been described in relation to a preferred embodiment thereof, it will be obvious to those skilled in the art that the structural details are capable of wide variation without departing from the principles of the invention.

I claim:

1. A baling apparatus particularly adapted for reducing a volume of solid waste material, such as cardboard and the like, to a substantially smaller volume by packing such material, under pressure, into compacted bales, including frame means defining a compacting chamber therein, a ram mounted for vertical reciprocal movement within said frame means relative to said compacting chamber to exert the pressure on the waste material placed in said compacting chamber required to pack such material into a compacted bale, closure means mounted on said frame means and movable to provide access to said compacting chamber to allow removal of the compacted bale from said chamber subsequent to compaction, and bale ejection means to provide easy, controlled ejection of the compacted bale from said chamber including support means extending through elongated vertical openings in a side of said frame, said support means being pivotally mounted on said frame means and movable adjacent the compacted bale to support the bale during the ejection of the bale from said compacting chamber, and bale lift means pivotally mounted on said bale support means external to said compacting chamber, said bale lift means having catch means disposed on an upper portion thereof, said catch means being selectively insertable through said vertical openings, said bale lift means being movable on said bale support means relative to said frame means, when ejection of said bale is desired, from a first non-operating position to a second position where said bale lift means are disposed for engagement with said ram by said catch means being inserted through said vertical openings, said ram moving upwardly within said frame means, said ram engaging said catch means on said lift means to move said lift means upwardly relative to said frame means thereby causing said bale support means to be pivoted relative to said frame means to move the compact bale and eject it from the baling apparatus.

2. The baling apparatus of claim 1 additionally including guide means mounted on said ram and disposed about at least a portion of the periphery of said ram, said guide means being formed to extend outwardly therefrom into said elongated vertical openings in the side wall of said frame means, said guide means traveling in said openings along said wall as said ram is moved reciprocally within said frame thereby guiding the movement of said ram and preventing movement of waste materials from the compacting chamber between the ram and said frame or to top of said ram.

3. The baling apparatus of claim 1 wherein said closure means includes a door movably mounted on said frame and defining at least one side of said compacting chamber, said door providing access to said compacting chamber for removal of the compacted bale, and locking means disposed to engage said door in closed position, to securely maintain said door in closed position during compaction, said locking means having an elongated vertical locking member pivotally mounted on said frame for movement relative to said door and said frame, handle means connected to said locking member to move said locking member relative to said door and said frame, and latch means mounted on said door to engage a portion of said handle means to maintain said handle means adjacent said door when said door is in closed position, said locking member being movable to engage said door along a substantial portion of the height thereof when said door is in closed position, to receive stresses exerted on said door during compaction evenly over the length of said elongated locking member thereby to prevent outward movement of said door during compaction.

4. The baling apparatus of claim 1 and further comprising waste blocking wedges located on the side walls of said compacting chamber.

5. A baling apparatus particularly adapted for reducing a volume of solid waste material, such as cardboard and the like, to a substantially smaller volume by packing such material, under pressure, into compacted bales, including frame means defining a compacting chamber therein, a ram mounted for vertical reciprocal movement within said frame means relative to said compacting chamber to exert the pressure on the waste material placed in said compacting chamber required to pack such material into a compacted bale, closure means mounted on said frame means and movable to provide access to said compacting chamber to allow removal of the compacted bale from said chamber subsequent to compaction, and bale ejection means to provide easy, controlled ejection of the compacted bale from said chamber including support means pivotally mounted on said frame means and movable adjacent the compacted bale to support the bale during the ejection of the bale from said compacting chamber, and bale lift means pivotally mounted on said bale support means, said bale lift means having catch means disposed on an upper portion thereof, said bale lift means being movable on said bale support means relative to said frame means, when ejection of said bale is desired, from a first non-operating position to a second position where said bale lift means are disposed for engagement with said ram moving upwardly within said frame means, said ram engaging said catch means on said lift means to move said lift means upwardly relative to said frame means thereby causing said bale support means to pivoted relative to said frame means to move the compacted bale and eject it from the baling apparatus, said bale support means including a pair of spaced L-shaped arms, each having a first leg disposed below the compacted bale, and a second leg disposed generally parallel to a side of the compacted bale, said arms being pivotal about an edge of a lower end of said frame means thereby to be brought into intimate supporting contact with the bottom and side of the compact bale, and said lift means includes a pair of elongated members spaced corresponding to said L-shaped arms and connected for unitary movement by transverse bar means, each of said elongated members having a lower portion pivotally mounted on the corresponding L-shaped arm, said catch means disposed on the upper portion of each of said elongated members including hook means extending inwardly toward said frame, said elongated members being movable toward said frame to position said hook means through elongated vertical openings provided in a side of said frame in the path of travel of said ram such that said ram, upon moving upwardly within said frame, will engage said hook means to lift said elongated members upwardly relative to said frame to thereby pivot said bale support means and the compacted bale supported thereby relative to said frame to eject the bale.

6. In a baling apparatus particularly adapted for reducing a volume of solid waste material, such as cardboard and the like, to a substantially smaller volume by packing such material, under pressure, into compacted bales, including frame means defining a compacting chamber having side walls and a bottom wall therein, a ram mounted for reciprocal movement along and within said frame means relative to said compacting chamber to exert the pressure on the waste material placed in said compacting chamber required to pack such material into a compacted bale, and closure means mounted on said frame means and forming at least one side of said compacting chamber, said closure means movable to provide access to said compacting chamber to allow removal of the compacted bale, the improvement including bale ejection support means disposed along the bottom and at least one side wall of said compacting chamber, the side of said support means being recessed in a side wall of said compacting chamber and the bottom of said support means being recessed in the bottom wall of said compacting chamber during compacting of the waste material, the bottom of said bale ejection support means having one end extending through elongated vertical openings in a side wall of said compacting chamber, the other end thereof being pivotally mounted on said frame means for movement of said support means adjacent the bottom and side of the compacted bale to support the bale during its ejection from said compacting chamber, and bale lift means pivotally mounted on said bale ejection support means external to said compacting chamber, said bale lift means having catch means disposed on an upper portion thereof, and selectively insertable through said vertical openings, said bale lift means being movable on said bale support means relative to said frame means when ejection of said bale from said compacting chamber is desired from a first non-operating position to a second position wherein said bale lift means is disposed for engagement with said ram by insertion of said catch means through said vertical openings, said ram moving upwardly within said frame means, said ram engaging said catch means on said lift means to move said lift means upwardly relative to said frame means thereby causing said bale ejection support means to be pivoted relative to said frame means to move the compacted bale and eject it from said compacting chamber of said baling apparatus.

7. The improvement set forth in claim 6 wherein said bale ejection support means includes a pair of spaced L-shaped arms, each having a first leg disposed below the compacted bale, and a second leg disposed generally parallel to a side of the compacted bale, said arms pivotal about an edge of a lower end of said frame means thereby to be brought into intimate supporting contact with the bottom and side of the compacted bale, and said lift means includes a pair of elongated members spaced corresponding to said L-shaped arms and connected for unitary movement by transverse bar means, each of said elongated members having a lower portion pivotally mounted on the corresponding L-shaped arm, said catch means disposed on the upper portion of each of said elongated members including hook means extending inwardly toward said frame, said elongated members being movable toward said frame to position said hook means through openings provided in a side of said frame in the path of travel of said ram such that said ram, upon moving upwardly within said frame, will engage said hook means to lift said elongated members upwardly relative to said frame to thereby pivot said bale support means and the compacted bale supported thereby relative to said frame to eject the bale.

8. The improvement set forth in claim 6 additionally including guide means mounted on said ram and disposed about at least a portion of the periphery of said ram, said guide means being formed to extend outwardly therefrom into said elongated vertical openings in the side wall of said frame means, said guide means traveling in said openings along said wall as said ram is moved reciprocally within said frame thereby guiding the movement of said ram and preventing movement of waste materials from the compacting chamber between the ram and said frame or to the top of said ram.

9. The improvement set forth in claim 6 wherein said closure means includes a door movably mounted on said frame and defining at least one side of said compacting chamber, said door providing access to said compacting chamber for removal of the compacted bale, and the improvement comprising locking means disposed to engage said door in closed position, to securely maintain said door in closed position during compaction, said locking means having an elongated vertical locking member pivotally mounted on said frame for movement relative to said door and said frame, handle means connected to said locking member to move said locking member relative to said door and said frame, and latch means mounted on said door to engage a portion of said handle means to maintain said handle means adjacent said door when said door is in closed position, said locking member being movable to engage said door along a substantial portion of the height thereof when said door is in closed position, to receive stresses exerted on said door during compaction evenly over the length of said locking member thereby to prevent outward movement of said door during compaction.

10. The improvement set forth in claim 6 wherein said bale lift means is positioned for engagement by said ram by movement of actuation means operatively engaging said lift means, said actuation means being mounted on said frame means and being urged forwardly toward said closure means by resilient means, said actuation means having a forward handle portion engaging said closure means in a closed position, and a shaft portion, connected to said handle portion at its forward end and extending rearwardly along a side of said frame means to engage said lift means at its opposite, rearward end, said actuation means being thereby laterally immovable when said closure means is in closed position and, therefore inoperable to permit movement of said bale lift means, and alternatively, when said closure means is in open position, being urged forward to allow said bale lift means to be moved forward to engage said ram.

11. The improvement set forth in claim 6 and further comprising door blocking tabs on the bottom of said support means to engage said closure means to prevent movement of said support means when said closure means is closed and to prevent closing of said closure means unless the bottom of said support means is properly recessed in the bottom wall of said compacting chamber.

12. A baling apparatus particularly adapted for reducing a volume of solid waste material, such as cardboard and the like, to a substantially smaller volume by packing such material, under pressure, into compacted bales, including frame means defining a compacting chamber therein, a ram mounted for vertical reciprocal movement within said frame means relative to said compacting chamber to exert the pressure on the waste material placed in said compacting chamber required to pack such material into a compacted bale, closure means mounted on said frame means and movable to provide access to said compacting chamber to allow removal of the compacted bale from said chamber subsequent to compaction, and bale ejection means to provide easy, controlled ejection of the compacted bale from said chamber including support means pivotally mounted on said frame means and movable adjacent the compacted bale to support the bale during the ejection of the bale from said compacting chamber, and bale lift means pivotally mounted on said bale support means, said bale lift means having catch means disposed on an upper portion thereof, said bale lift means being movable on said bale support means relative to said frame means, when ejection of said bale is desired, from a first non-operating position to a second position where said bale lift means are disposed for engagement with said ram moving upwardly within said frame means, said ram engaging said catch means on said lift means to move said lift means upwardly relative to said frame means thereby causing said bale support means to be pivoted relative to said frame means to move the compacted bale and eject it from the baling apparatus, and safety means cooperating with said closure means to prevent operation of said bale ejection means when said closure means is in a closed position relative to said frame means.

13. The baling apparatus of claim 12 wherein said safety means comprises actuation means operatively engaging said bale lift means, said actuation means being mounted on said frame means and being urged forwardly toward said closure means by resilient means, said actuation means having a forward handle portion engaging said closure means in a closed position, and a shaft portion, connected to said handle portion at its forward end and extending rearwardly along a side of said frame means to engage said lift means at its opposite, rearward end, said actuation means being thereby laterally immovable when said closure means is in closed position and, therefore inoperable to permit movement of said bale lift means, and alternatively, when said closure means is in open position, being urged forward to allow said bale lift means to be moved forward to engage said ram.

* * * * *